United States Patent
Mayernick

(10) Patent No.: US 7,460,488 B2
(45) Date of Patent: Dec. 2, 2008

(54) METHOD AND APPARATUS FOR ROUTER PORT CONFIGURATION

(75) Inventor: Mark Ryan Mayernick, Boulder, CO (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 10/552,560

(22) PCT Filed: Feb. 26, 2004

(86) PCT No.: PCT/US2004/005684

§ 371 (c)(1),
(2), (4) Date: Oct. 11, 2005

(87) PCT Pub. No.: WO2004/095278

PCT Pub. Date: Nov. 4, 2004

(65) Prior Publication Data

US 2006/0198356 A1 Sep. 7, 2006

Related U.S. Application Data

(60) Provisional application No. 60/462,998, filed on Apr. 15, 2003.

(51) Int. Cl.
H04L 12/28 (2006.01)

(52) U.S. Cl. .................. 370/254; 370/351; 370/401; 370/419; 370/463; 709/220; 709/238; 710/10; 710/38

(58) Field of Classification Search .................. 370/217, 370/219, 220, 221, 254, 401, 402, 465, 419, 370/420, 463; 709/220, 221, 222, 238, 239, 709/242; 710/10, 38, 43
See application file for complete search history.

(56) References Cited

U.S. PATENT DOCUMENTS

| | | | |
|---|---|---|---|
| 5,313,465 A | * | 5/1994 | Perlman et al. ............. 370/254 |
| 5,463,625 A | | 10/1995 | Yasrebi ...................... 370/401 |
| 5,487,170 A | | 1/1996 | Bass et al. ................. 370/461 |
| 5,524,253 A | * | 6/1996 | Pham et al. ................. 709/202 |
| 5,828,835 A | * | 10/1998 | Isfeld et al. ................. 709/200 |
| 5,915,087 A | * | 6/1999 | Hammond et al. ............ 726/12 |

(Continued)

FOREIGN PATENT DOCUMENTS

EP 0 926 859 A2 12/1998

(Continued)

OTHER PUBLICATIONS

Search Report.

*Primary Examiner*—Chi H. Pham
*Assistant Examiner*—Shick Hom
(74) *Attorney, Agent, or Firm*—Joseph J. Laks; Paul P. Kiel; Guy H. Eriksen

(57) ABSTRACT

A method and apparatus for selectively configuring, in a router, physical ports to either a Wide Area Network (WAN) or a Local Area Network (LAN). Method steps include receiving a message to configure a physical port for use with either the LAN or WAN; associating, in response to receiving the message, a set of mapping assignments for using the physical port to access the network; and implementing the mapping assignments, in response to associating the mapping assignments, to configure the physical port for coupling to the network.

17 Claims, 3 Drawing Sheets

U.S. PATENT DOCUMENTS

| | | | |
|---|---|---|---|
| 6,097,732 A * | 8/2000 | Jung | 370/466 |
| 6,108,345 A | 8/2000 | Zhang | 370/445 |
| 6,449,251 B1 * | 9/2002 | Awadallah et al. | 370/229 |
| 6,859,452 B1 * | 2/2005 | Crooks | 370/355 |
| 6,862,564 B1 * | 3/2005 | Shue et al. | 703/25 |
| 7,031,324 B1 * | 4/2006 | Goody | 370/401 |
| 2002/0065941 A1 | 5/2002 | Kaan et al. | 709/249 |
| 2002/0104016 A1 | 8/2002 | Pan et al. | 709/238 |
| 2002/0114336 A1 * | 8/2002 | Chow | 370/401 |
| 2002/0118642 A1 | 8/2002 | Lee | 370/230 |
| 2002/0176426 A1 | 11/2002 | Asano et al. | 370/401 |
| 2003/0033418 A1 | 2/2003 | Yound et al. | 709/230 |
| 2003/0058894 A1 * | 3/2003 | Feuerstraeter et al. | 370/518 |
| 2003/0101244 A1 | 5/2003 | Lockridge et al. | 709/220 |
| 2008/0027567 A1 * | 1/2008 | Philyaw | 700/40 |

FOREIGN PATENT DOCUMENTS

| | | |
|---|---|---|
| EP | 1 225 725 A2 | 7/2002 |

* cited by examiner

METHOD AND APPARATUS FOR ROUTER PORT CONFIGURATION

This application claims the benefit under 35 U.S.C. 365 § of International Application PCT/US04/005684, filed Feb. 26, 2004, which was published in accordance with PCT Article 21(2) on Oct. 28, 2004 in English and which claims the benefit of U.S. provisional patent application No. 60/462,998, filed Apr. 15, 2003.

FIELD OF THE INVENTION

The present invention generally relates to communication systems and, more particularly, to a method and apparatus for router port configuration.

BACKGROUND OF THE INVENTION

A Local Area Networks (LAN) is a short distance data communications network (typically within a building or campus, though not necessarily so limited) used to link together computers and peripheral devices under some form of standard control. Personal computers, information appliances, and other computing devices have become so numerous and ubiquitous that many families are now purchasing routing devices to establish home networking LANS. Often this is done to share a common broadband access point (e.g.—a cable modem) among a number or computers or other information appliances, or to share peripherals such as printers. Many other motivations also exist to establish LANS. A router may be a stand-alone routing device or incorporated within the broadband modem or other node. They may be wired or wireless. One common feature among routers is that they all have ports through which connections are made to a Wide Area Network (WAN) and/or LAN.

Routers typically have multiple physical ports assigned as LAN ports, but usually only a single physical port designated as a WAN port (although there are routers on the market which feature multiple WAN ports). In a typical home network environment, the router's LAN ports service computers, printers, and other information appliances which are desired to be coupled to the LAN, while the router's WAN port is used to gain access to the Internet via a modem (such as a cable, dial-up, or DSL modem). Designation as a WAN port therefore signals router applications like firewall, Network Address and Port Translation (NAPT), packet routing and others to treat all packet traffic to/from the port as unsecured and non-trusted as compared to LAN port packet traffic. This designation as a WAN port is used by the router for special unsecured and non-trusted functionalities when manipulating, routing and filtering packets internally between the designated WAN port and LAN ports. The WAN port is given a specific physical port assignment within the router, and present routers do not have the capability to reassign the WAN port to a different physical port. This becomes problematic when the WAN port is faulty and becomes unusable, making the router virtually unusable since its ability to transmit data to and from an unsecured WAN (such as the Internet) becomes untenable or compromised.

SUMMARY OF THE INVENTION

The present invention is a method and apparatus for selectively configuring, in a router, a physical port for coupling to a network. In a preferred embodiment of the invention, the router is thus able to configure and adapt any one of a plurality of physical ports for use with a LAN or a WAN.

The method produces this result by receiving a message to configure the physical port for use with the desired network; associating, in response to receiving the message, a set of mapping assignments for using the physical port to access the network; and implementing the mapping assignments, in response to associating the mapping assignments, to configure the physical port for coupling to the selected network.

The apparatus accomplishes the result achieved by the described method by using a WAN/LAN port manager which controls the selection of the physical port and protocols for use with a selected network type.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

The present invention is a method and apparatus for router port configuration. The present invention is described within the context of a router servicing a LAN home network with WAN access to the Internet using a broadband modem (such as a cable modem) and via an Internet service provider (ISP). It is noted that such an arrangement is merely illustrative in that it is but one preferred embodiment of a communications system utilizing the principles of the present invention. Those skilled in the art, however, will appreciate that the present invention can be advantageously employed in any communications system in which various network devices are coupled to a router. Thus, the present invention has broad applicability beyond the particular network systems described herein. For example, the WAN accessed by the router may be any type of WAN, not exclusively limited to a WAN accessing the Internet, and may be accessed by any apparatus capable of coupling the router with the WAN and not necessarily limited to use of a broadband modem. Similarly, the LAN is not limited in application to a home network, but may be any type of LAN encompassed within the definition of a LAN. LAN devices may be coupled via wired or wireless connections.

Figure 1:
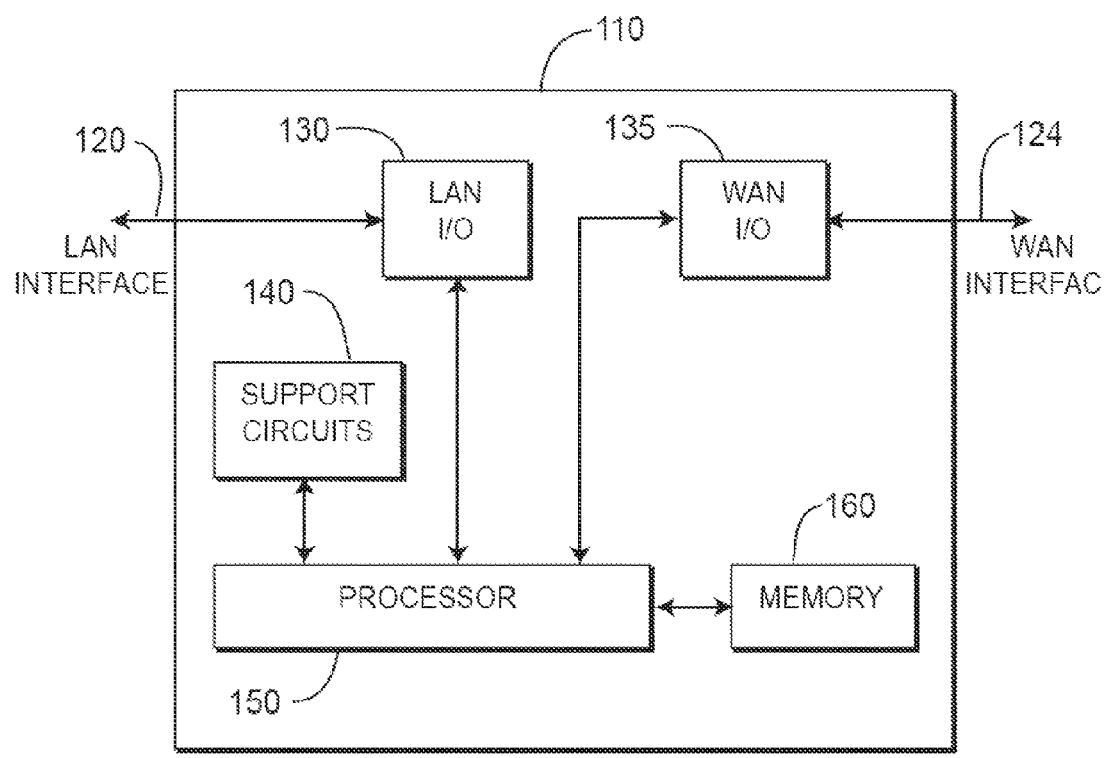
FIG. 1 depicts a high-level block diagram showing one embodiment of a router utilized in accordance with the principles of the present invention.

FIG. 1 depicts a high-level block diagram showing one embodiment of a router 110 utilized in accordance with the principles of the present invention. The router 110 comprises a processor 150 as well as a memory 160 for storing router application programs, data, and information, such as software routines for executing a method of configuring router physical ports for use as LAN and WAN ports. The processor 150 cooperates with conventional support circuitry 140, such as power supplies, clock circuits, cache memory, and the like, as well as circuits that assist in executing the software routines stored in the memory 160. Of course, some of the process steps discussed herein as software processes may be implemented within hardware, for example, circuitry that cooperates with the processor 150 to perform various steps. The router 110 includes LAN input/output (I/O) circuitry 130 to provide a LAN interface 120 for accessing the LAN. The router also includes WAN input/output (I/O) circuitry 135 to provide a WAN interface 124 for accessing the WAN. Such interfaces are shown as functionally separate from the processor 150, memory 160, and support circuits 140 for illustrative purposes only, their implementation may in fact be incorporated in the combination of hardware and/or software which comprises the processor 150, memory 160, and support circuits 140 elements of the router 110.

Although the router 110 of FIG. 1 depicts a general-purpose processor 150 that is programmed to perform various control functions in accordance with the present invention, the invention may be implemented in hardware, for example, as an application specific integrated circuit (ASIC). As such, the process steps described herein are intended to be broadly interpreted as being equivalently performed by software, hardware, or a combination thereof.

Figure 2:
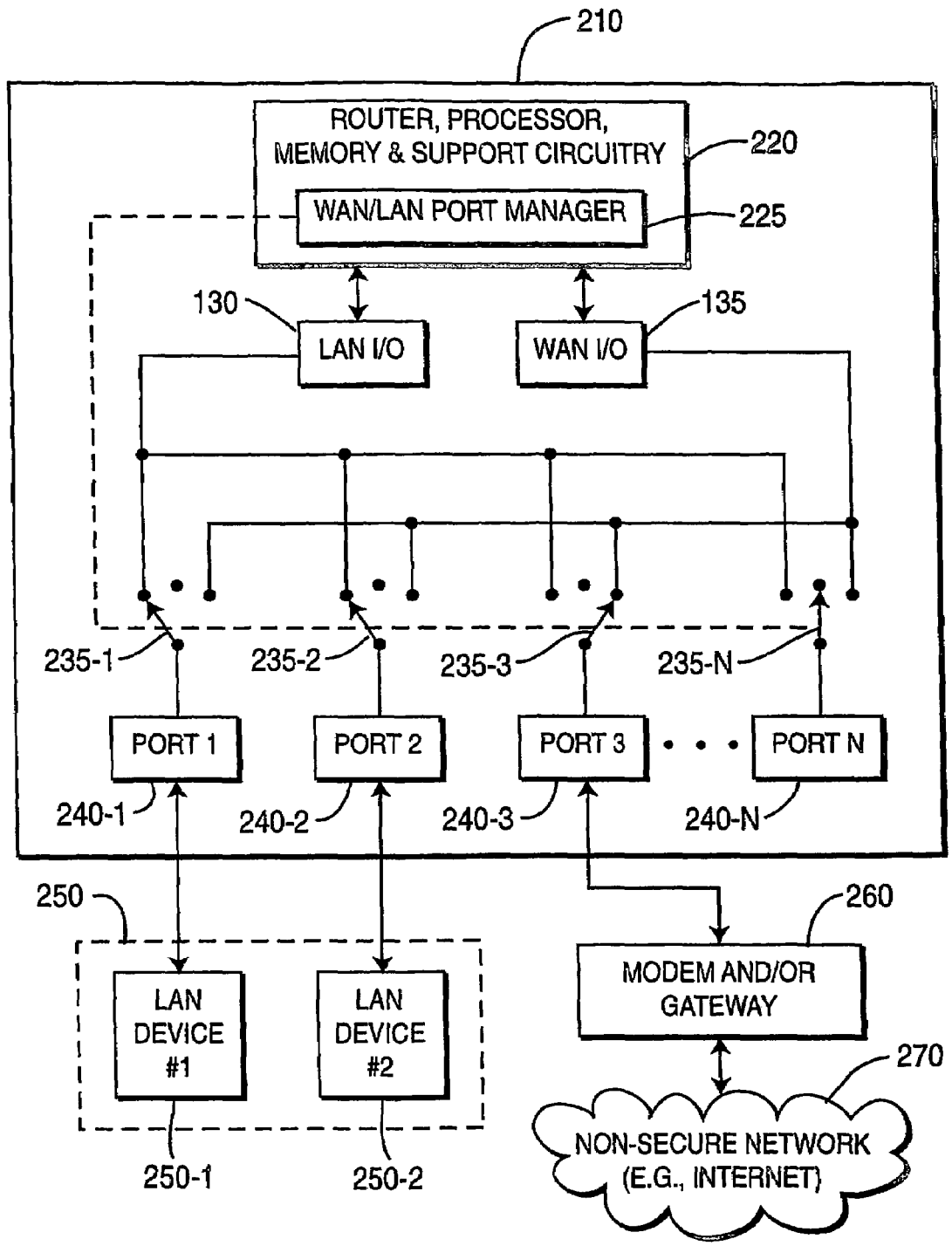
FIG. 2 depicts a high-level block diagram of an illustrative communications system suitable for use in accordance with the principles of the present invention.

FIG. 2 depicts a high-level block diagram of an illustrative communications system 200 incorporating an alternative router functional block diagram and utilizing the principles of the present invention. In the illustrated embodiment, the communications system 200 comprises a router 210, a local area network (LAN) 250, a modem or gateway 260, and a wide area network (WAN) 270, such as the Internet. The router 210 is illustrated as being comprised of router processor, memory and support circuitry 220 in communication with and coupled to the LAN I/O 130 and the WAN I/O 135 interfaces. The LAN I/O 130 and the WAN I/O 135 interfaces are subsequently coupled to physical router ports $240_1$, $240_2$, $240_3$, ..., $240_N$, (collectively physical router ports 240) via switching circuits $235_1$, $235_2$, $235_3$, ..., $235_N$, (collectively switching circuits 235).

In the instant embodiment, a portion of the router processor, memory and support circuitry 220 is shown illustrated as the WAN/LAN port manager 225. In this preferred embodiment, the port manager is incorporated within the router 210 itself and shares the processor, memory, and support circuitry 220 with other router functionality, essentially allowing the additional functionality of programmable and assignable physical ports for LAN/WAN assignment with little or no additional cost margin. However, the principles of the invention are not to be construed as being so limited and embodiments in which additional and dedicated components/parts are used to implement port management functionality are also contemplated as being within the scope of the present invention. The WAN/LAN port manager 225 is operable to effectuate, implement and control the switching circuits 235 to selectively receive commands/messages to assign specific physical router ports 240 as WAN or LAN ports (or in the alternative, to disable a physical port 240 completely). The WAN/LAN port manager 225 communicates with the LAN I/O interface 130 and the WAN I/O interface 135. Each of the physical port switching circuits 235 may be configured independently, with each physical port able to be assigned as a LAN port, a WAN port, or disabled. Therefore, when a switching circuit 235 is selected to the LAN interface setting, that port directs communications to and from only the LAN I/O interface 130 for that port. Similarly, when a switching circuit 235 is selected to the WAN interface setting, that port directs communications to and from only the WAN I/O interface 135 for that port. When a switching circuit 235 is selected to the disable setting, the port is completely disabled, and no communications will occur at that port.

The LAN 250 in the instant embodiment is shown as being comprised of a first LAN device $250_1$ and a second LAN device $250_2$, which are selectively coupled to LAN I/O interface 130. Typical LAN devices can include, but are not limited to, personal computers (PCs), additional routers, file servers, printers, scanners, wireless access points, personal digital assistants (PDAs), docking stations, and other information appliances. The actual number of LAN devices coupled to the LAN 250 are limited merely by the number of physical ports 240 available at the router 210; and of course, routers may be daisy-chained to provide for a multiplicity of available physical router LAN ports. In the instant embodiment, the first LAN device $250_1$ is connected to physical router port $240_1$, which is coupled to the LAN I/O interface 130 via switching circuit $235_1$. Similarly, the second LAN device $250_2$ is connected to physical router port $240_2$, which is coupled to the LAN I/O interface 130 via switching circuit $235_2$.

The WAN 270 in the instant embodiment is shown as being a non-secure packet network, such as the Internet. Access to the WAN 270 by the router 210 is via modem/gateway 260 and typically via an Internet service provider (ISP, not shown). The modem 260 is connected to physical router port $240_3$, which is coupled to the WAN I/O interface 135 via switching circuit $235_3$.

Physical port $240_N$ is shown as unused (no device physically connected to the port) and is further shown as disabled. That is, the switching circuit associated with physical port $240_N$ is selected to neither the LAN I/O interface 130 nor the WAN I/O interface 135.

Typical of router functionality, WAN and LAN communications are kept separate, due to the secure nature of LAN communications, and the inherent non-secure nature of WAN communications, except for those communications specifically allowed by the router 210 ruleset. Routers maintain a set of instructions as to which communications may occur between the LAN and WAN. This aspect of router operation is well-known by those skilled in the art and outside the scope of the present invention, and therefore, a detailed description of general router operation will not be recited here.

Typically, the WAN interface of a router is limited to a single physical port, and even in those routers having more than a single physical port assigned as a WAN port, the designation as a WAN router port is fixed. As previously described, the WAN is also typically a non-secure network in which the possibility exists that a received communication may be detrimental to LAN devices and their operation if passed through to the LAN.

Therefore, in accordance with the principles of the present invention, the WAN/LAN port manager 225 performs the port reconfiguration function by receiving a reconfiguration message or command. This message includes re-mapping information regarding the physical ports 240 to which the WAN/LAN are connected. This information enables the router 210 to use a different physical port for the WAN in case the current physical port being used as the WAN port becomes damaged, disabled or undesirable for operational and/or configuration purposes. Although described in terms of the re-mapping of a physical port previously configured as a LAN port into a WAN port, the opposite function may also be performed. That is, a WAN port may be reconfigured as a LAN port. Thus, the present invention is useful as a physical port configuration tool, rather than merely a tool to convert a LAN port to a WAN port.

Various means for accomplishing the router's port reconfiguration are encompassed by the principles of the present invention. For example, the WAN/LAN port manager 225 may receive a port re-mapping message from several sources; including but not limited to, a message sent over the LAN to the router, a message sent over the WAN to the router, or via physical switches. One illustrative means for conveying a re-mapping message is via a HyperText Transfer Protocol (HTTP) message. Another illustrative means is via a Simple Network Management Protocol (SNMP) message. Yet another illustrative means is via a router specific proprietary message. It should be noted once again that although illustrated and described as a separate functional block within the router 210 architecture, the WAN/LAN port manager 225 and the re-mapping management function may not be a separate functional block within the architecture, but rather functionally distributed throughout other functional modules/blocks within the router 210. Therefore, in an implementation of one embodiment of the present invention, the WAN/LAN port manager 225 may be implemented as one functional block that includes the LAN I/O interface 130 and the WAN I/O interface 135. Furthermore, although illustrated and described in terms of specific switching circuits 240, the switching function of physical ports for LAN and WAN use may be implemented strictly within software, strictly within hardware, or as a combination of the two.

A WAN port re-mapping message includes information about which physical port is to be coupled with the WAN I/O interface 135. Similarly, a LAN port re-mapping message includes information about which physical port is to be coupled with the LAN I/O interface 130. Other information may be included in a WAN/LAN re-mapping message. For example, the re-mapping message may include previous WAN port re-mapping information depending on the level of user control that the router implementation has enabled. Therefore, the previously mapped WAN physical port is re-mapped as a LAN I/O interface 130. During the reconfiguration of the port switches 235 (or re-associating of the set of physical port mapping assignments for use as LAN and WAN ports), the WAN/LAN port manager 235 also communicates the WAN/LAN port re-mapping information to the router, which includes the LAN I/O interface 130 and the WAN I/O interface 135. This information may then be used by the router and router interfaces to adjust internal operations which might include MAC address information mapped to the affected WAN and LAN ports.

The router's physical ports 240 can be of any type of physical interface over which communications can be sent to and received from the LAN and WAN. Illustrative examples of physical mediums include, but are not limited to, Ethernet, Bluetooth, 802.11a, 802.11b, 802.11g, universal serial bus (USB), and infrared. The number of physical ports is not limited and ranges from 1 . . . N. However, N must be greater than one to accommodate at least one WAN port and one LAN port.

Communications between physical LAN ports occur as handled by the router LAN I/O interface 130. The set of rules that directs and controls the flow of communications between LAN ports is independent of the rule set that controls communication flow between the LAN I/O interface 130 and WAN I/O interface 135 for the router. Although not shown in the instant embodiment (the embodiment in FIG. 2 shows only one configured WAN port, not a plurality of configured WAN ports), the set of rules that directs and controls the flow of communications between WAN ports is independent of the rule set that controls communication flow between the LAN I/O interface 130 and WAN I/O interface 135 for the router.

Figure 3:
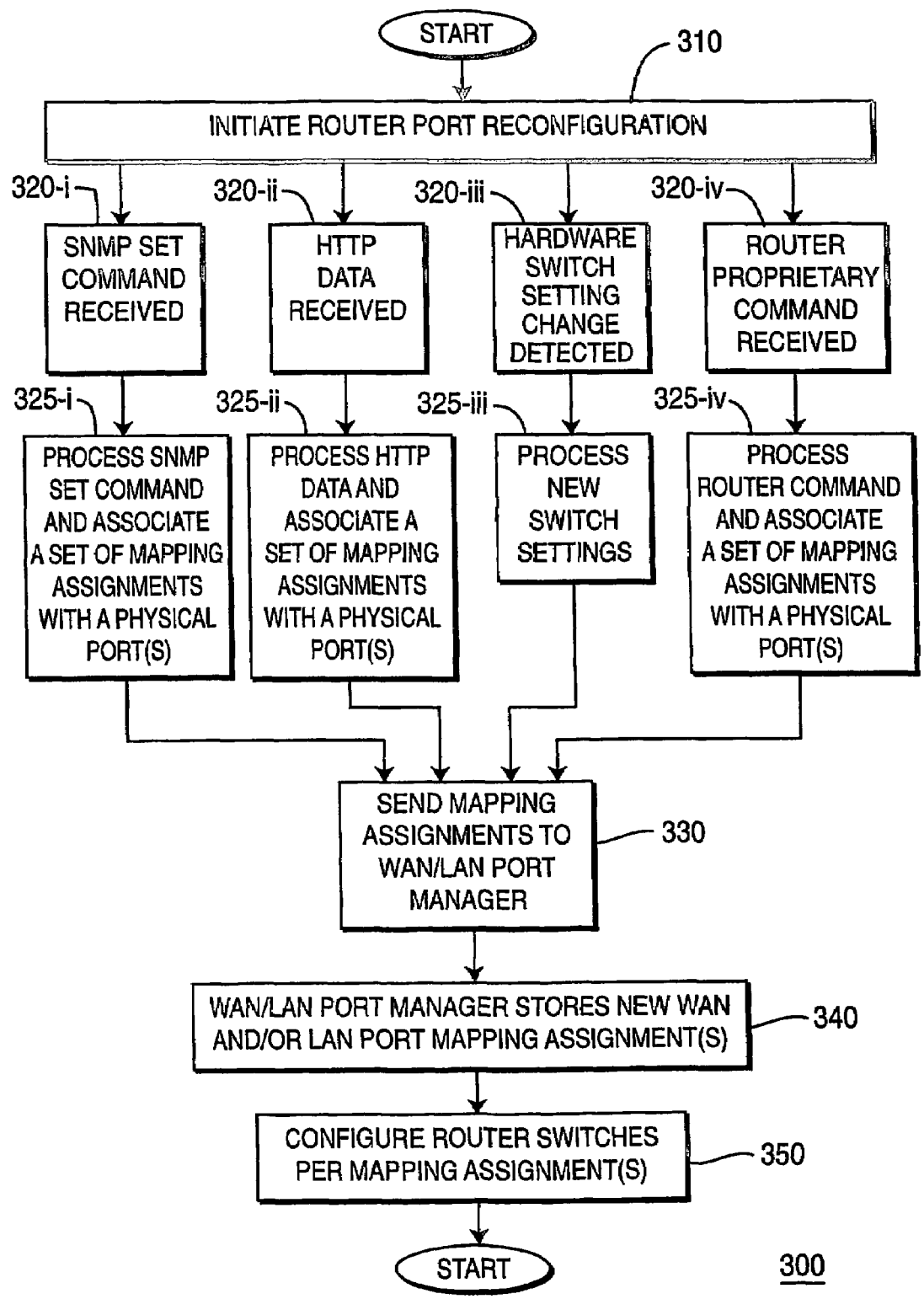
FIG. 3 depicts a high-level flow diagram showing one embodiment of a method for reconfiguration of a router port in accordance with the principles of the present invention.

FIG. 3 depicts a high-level flow diagram showing one embodiment of a method 300 for re-mapping a physical WAN port of a router in a communication system. The procedure begins at step 310 by initiating a router port reconfiguration. In accordance with step 320, a message or command is received at the router to implement a router port configuration change, and four alternative methods for the type of initiating messages are depicted, although other message/command types and formats may also be used by those skilled in the art and still be encompassed by the principles of the present invention.

In accordance with step $320_i$, an SNMP SET command is received by the router. The SNMP protocol is a widely used and standardized protocol for controlling and managing networked devices. Using a defined Management Information Base (MIB) variable or variables, an SNMP SET command is used to provide the router with WAN and LAN port re-mapping information.

In accordance with step $320_{ii}$, an HTTP data command is received by the router. The HTTP protocol is a protocol widely used by web servers and browsers to communicate over the Internet.

In accordance with step $320_{iii}$, a third type of initiation is from a hardware switch or group of switches located on the router itself. When a switch state change is detected, the new switch state is compared to the old switch state.

In accordance with step $320_{iv}$, a proprietary router protocol message is received by the router. This message can be received from any physical port like a LAN port or WAN port.

In accordance with step 325, the message/command (detected switch position in the case of step $320_{iii}$) is processed and a set of mapping assignments is created for association of router physical port with the LAN and WAN I/O interfaces.

In accordance with step $325_i$, the SNMP SET command is processed, and the mapping assignments parsed from the command message. The mapping assignments associate at least one physical router port for use as a WAN or LAN port.

In accordance with step $325_{ii}$, the received HTTP data command message is processed, and the mapping assignments parsed from the command message. The mapping assignments associate at least one physical router port for use as a WAN or LAN port.

In accordance with step $325_{iii}$, when a switch state change is detected and the new switch state compared with old switch state, a set of mapping assignments is created based upon the detected switch position. The mapping assignments associate at least one physical router port for use as a WAN or LAN port.

In accordance with step $325_{iv}$, the received proprietary router protocol message is processed, and the mapping assignments parsed from the command message. The mapping assignments associate at least one physical router port for use as a WAN or LAN port.

Regardless of which leg of steps 320 and 325 are utilized, the physical port mapping assignments are sent to the WAN/LAN port manager, in accordance with step 330.

In accordance with step 340, the WAN/LAN port manager stores the received physical port mapping assignments in memory. In addition, the physical port mapping assignments are utilized to configure the physical port switching circuits to conform with the requested WAN and LAN port assignments, in accordance with step 350.

The foregoing description merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various illustrated or described elements, including functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

The invention claimed is:

1. A method of configuring, in a router having a LAN interface and a WAN interface, a physical port for coupling to a network, said method comprising:
   receiving a message to configure said physical port for use with said network;
   associating, responsive to receiving said message, a set of mapping assignments for using said physical port to access said network; and
   implementing said mapping assignments, responsive to associating said mapping assignments, to configure said physical port for coupling to said network,
   wherein said implementing step selectively controls whether said physical port is coupled to the LAN interface or the WAN interface.

2. The method of claim 1, further comprising:
   storing said mapping assignments.

3. The method of claim 1 wherein said network is a Wide Area Network (WAN).

4. The method of claim 1 wherein said network is a Local Area Network (LAN).

5. The method of claim 1 wherein said network is a Local Area Network (LAN) prior to said step of implementing and is a Wide Area Network (WAN) after said step of implementing.

6. The method of claim 1 wherein said message is implemented using an Simple Network Management Protocol (SNMP) SET command.

7. The method of claim 1 wherein said message is implemented using HyperText Transfer Protocol (HTTP) data.

8. The method of claim 1 wherein said message is created after detecting at least one hardware switch setting change.

9. The method of claim 1 wherein said message is implemented using a router proprietary command message.

10. A router having a physical port for coupling to a network and further having a LAN interface and a WAN interface, said router comprising:
    means for receiving a message to configure said physical port for use with said network;
    means for associating, responsive to receiving said message, a set of mapping assignments for using said physical port to access said network; and
    means for implementing said mapping assignments, responsive to associating said mapping assignments, to configure said physical port for coupling to said network,
    wherein said implementing means selectively controls whether said physical port is coupled to the LAN interface or the WAN interface.

11. A router comprising:
    processor, memory, and support circuitry having a WAN/LAN port manager;
    a LAN interface;
    a WAN interface; and
    a plurality of physical ports selectively connectable to said LAN interface or said WAN interface,
    wherein said WAN/LAN port manager selectively controls whether each of said plurality of physical ports is physically coupled to said LAN interface or said WAN interface responsive to a configuration message and prior to a receipt of a corresponding packet to be routed by the router.

12. The method of claim 1, wherein said implementing step changes the physical port from a secure type physical port to a non-secure type physical port or from the non-secure type physical port to the secure type physical port.

13. The router of claim 10, wherein said implementing means changes the physical port from a secure type physical port to a non-secure type physical port or from the non-secure type physical port to the secure type physical port.

14. The method of claim 1, wherein said implementing step changes the physical port from a WAN type physical port to a LAN type physical port or from the LAN type physical port to the WAN type physical port.

15. The router of claim 10, wherein said implementing means changes the physical port from a WAN type physical port to a LAN type physical port or from the LAN type physical port to the WAN type physical port.

16. The method of claim 1, wherein said implementing step alters an initial designation of the physical port by a manufacturer of the router as one of a LAN type port or a WAN type port to one of the WAN type port or the LAN type port, respectively.

17. The router of claim 10, wherein said implementing means alters an initial designation of the physical port by a manufacturer of the router as one of a LAN type port or a WAN type port to one of the WAN type port or the LAN type port, respectively.

* * * * *